United States Patent
Parry

(10) Patent No.: US 8,027,462 B1
(45) Date of Patent: *Sep. 27, 2011

(54) STRUCTURE AND METHOD FOR CONVERSATION LIKE RENDERING FOR ECHO REDUCTION WITHOUT LOSS OF INFORMATION

(76) Inventor: James H. Parry, Pacific Grove, CA (US)

(*) Notice: Subject to any disclaimer, the term of this patent is extended or adjusted under 35 U.S.C. 154(b) by 1361 days.

This patent is subject to a terminal disclaimer.

(21) Appl. No.: 11/502,943

(22) Filed: Aug. 11, 2006

(51) Int. Cl.
*H04M 1/00* (2006.01)
(52) U.S. Cl. .............. 379/406.04; 379/406.07
(58) Field of Classification Search .......... 379/67, 379/67.1, 68, 83, 88.25, 88.28, 89, 88.04, 379/388, 388.01, 389, 391, 406.01–406.16
See application file for complete search history.

(56) References Cited

U.S. PATENT DOCUMENTS

| | | | |
|---|---|---|---|
| 4,652,700 A * | 3/1987 | Matthews et al. | 379/88.26 |
| 5,386,465 A * | 1/1995 | Addeo et al. | 379/202.01 |
| 5,768,364 A | 6/1998 | Karnowski et al. | |
| 6,332,153 B1 | 12/2001 | Cohen | |
| 7,916,855 B2 * | 3/2011 | Caballero-McCann et al. | 379/221.04 |
| 2004/0022371 A1 * | 2/2004 | Kovales et al. | 379/68 |
| 2004/0081296 A1 * | 4/2004 | Brown et al. | 379/88.14 |
| 2006/0088000 A1 * | 4/2006 | Hannu et al. | 370/328 |
| 2007/0274297 A1 * | 11/2007 | Cross et al. | 370/356 |

OTHER PUBLICATIONS

Parry, "Structure and Method for Echo Reduction Without Loss of Information", U.S. Appl. No. 11/502,809, filed Aug. 11, 2006.

* cited by examiner

*Primary Examiner* — MD S Elahee
*Assistant Examiner* — Akelaw Teshale
(74) *Attorney, Agent, or Firm* — Gunnison, McKay & Hodgson, L.L.P.; Forrest Gunnison

(57) ABSTRACT

A method for conversation like rendering of a stored audio information stream determines a first location in the stored audio information stream. The first location represents a point in time when the sound detection flag became active. The method next moves from the first location to a second location in the stored audio information stream. The second location is selected based upon a criterion to make playback of the stored audio information stream appear like actual conversation. Finally, the stored audio information stream is rendered starting with audio information stored at the second location.

15 Claims, 6 Drawing Sheets

STRUCTURE AND METHOD FOR CONVERSATION LIKE RENDERING FOR ECHO REDUCTION WITHOUT LOSS OF INFORMATION

BACKGROUND OF THE INVENTION

1. Field of the Invention

The present invention relates generally to techniques for permitting conversations between multiple parties at different locations, and more particularly to techniques for reducing echo effects while maintaining a more natural flow of conversation.

2. Description of Related Art

When electronic systems are utilized to communicate sounds between two or more locations, A, B, C, etc, undesirable echoes are generated when sounds received at location A, from locations B or C or others, are permitted to excite the microphone at location A and contribute to the audio signals sent out from location A. Methods used to reduce this echo effect include half duplex operation and acoustic echo cancellation.

In an audio communications system, which permits receiving and sending at the same time, any sound coupled from an output sound transducer, e.g., a loud speaker to an input sound transducer, e.g., a microphone, causes an echo-like disturbance at the far end unless the echo-like disturbance is electronically suppressed. One method used for echo suppression either reduced the strength of the signal being sent to the loud speaker or the signal being sent to the communications medium in response to a determination of the presence of locally generated sound. As described more completely below, this type of echo suppression typically resulted in loss of information.

Since strong attenuation was usually required to suppress this echo generation, the strong attenuation effectively resulted in one directional communications at any given time, thus resulting in half duplex operation. Inevitably, the users cut off the signal from each other with annoying frequency.

When the received sound is active and the locally generated sound is active, the condition is called "double talk". In half duplex operation during double talk, one or the other signal direction was cut off even though that direction was active.

A common example of this occurs with office speaker phones. These annoyances are greatly exaggerated when the communications medium introduces significant or variable delays as is common using the Internet and as is unavoidable in extraterrestrial travel.

Thus, in half duplex operation, the signal flowing in one direction is temporarily shut off when the strength of the signal flowing in the opposite direction exceeds some threshold value. This has the disadvantage that potentially important portions of the signals are lost.

To avoid the annoying characteristics of half duplex operation some implementations resorted to very complicated modeling of the acoustic coupling between the loud speaker and the microphone. Using this model an estimate was formed for the signal components due to acoustic coupling and that estimate was subtracted from the microphone signal before the signal was sent out. Such techniques routinely resorted to multiple heuristic and non-linear processes to mask the remaining echoes and other distortions resulting from imprecise model parameters and imperfect transducers.

In the operation of an acoustic echo canceller, a model of the coupling between the loud speaker and the microphone was trained adaptively during operation to subtract an amount of the signal level of the loud speaker from the microphone signal in an attempt to remove or reduce the perceived echo. Many training schemes and nonlinear methods were combined in acoustic echo cancellation to accommodate changes in the environment and imperfect estimates in the mathematical model. Some training schemes utilized strong bursts of noise to facilitate the rapid convergence of the mathematical model. Acoustic echo cancellation has the disadvantages of high cost and poor performance at unpredictable times.

SUMMARY OF THE INVENTION

According to one embodiment of the present invention, the advantages of the simple half duplex solution are achieved without most of the loss of information due to double talk. In this embodiment, multiple parties carry on a normal conversation over a communications medium, such as the Internet, using local user devices where at least one local device implements an embodiment of the novel conversation-like echo reduction method of this invention. A local party can speak over, e.g., interrupt, a remote party that is speaking, without losing what the remote party said.

In one embodiment of the echo reduction method, an audio information stream received from a remote facility is saved. A sound detection flag is activated when locally generated sound is detected. Locally generated sound is sound that originates locally. Sound from a loud speaker, which is outputting sound from the remote party that is speaking, is not considered to originate locally. The output based the received audio information stream is muted in response to the activating of the sound detection flag. Also, a rendering status of the received audio information stream is stored in response to the activating of the sound detection flag. The stored received audio information stream is rendered when the sound detection flag is inactive after being activated.

Thus, the local party is allowed to interrupt the remote party. However, unlike the prior art that lost the information from the remote party, the information from the remote party is stored and then played back when the local party stops speaking. Thus, the local party hears what the remote party was saying while the remote party was interrupted.

In one embodiment, the stored received audio information is accelerated. The accelerating is performed prior to the rendering in one case.

The activation of the sound detection flag can be accomplished in a number of ways. For example, the activation is accomplished by manual operation of a switch. In another embodiment, a microphone signal is compared to a loud speaker signal at a current time and is compared to the loud speaker signal at earlier times and the sound detection flag is activated when the comparison indicates locally generated sound. The comparison estimates ratios of energy levels at selected frequencies, or either alternatively or in combination, estimates pitch components of human speech.

The storing of the received audio information stream includes, in another embodiment, storing separately audio information streams received from each of two or more remote facilities. In one embodiment, the accelerating is performed separately for each of the stored audio information streams received from each of two or more remote facilities.

In another embodiment where multiple audio information streams are separately stored, the separately stored streams are retrieved and mixed to form a mixed stream of audio information. The mixed stream of audio information is stored in place of the separately stored audio information streams received from each of two or more remote facilities. The mixed stream of audio information can be accelerated prior to storing.

In another embodiment where multiple audio information streams are separately stored, the separately stored streams are retrieved and each of the separately stored audio information streams is accelerated. The separately accelerated audio information streams are mixed to form a mixed stream of audio information. The mixed stream of audio information is stored in place of the separately stored audio information streams received from each of two or more remote facilities.

In yet another embodiment, the storing of received audio information streams includes mixing audio information streams received from each of two or more remote facilities and storing the mixed received audio information stream.

In one embodiment, the echo reduction method includes moving, prior to the rendering, a read pointer for the stored received audio information stream from a current location to another location. In this embodiment, the rendering starts from the another location. In yet another embodiment, the moving is performed for each stream in a plurality of stored received audio information streams.

A computer program product has embedded therein executable instructions for an echo reduction method comprising:
  storing a received audio information stream;
  activating a sound detection flag following detection of locally generated sound;
  muting output based on the received audio information stream in response to the activating the sound detection flag;
  saving rendering status of the received audio information stream, in response to the activating the sound detection flag, to reduce loss of audio information; and
  rendering at least a portion of the stored received audio information stream following inactivating the sound detection flag.

A device includes a local sound detector coupled to receive a signal from an input sound transducer. The local sound detector activates a sound detection flag upon detecting locally generated sound in the signal from the input sound transducer. A controlled memory is coupled to receive audio information from at least one remote facility. An attenuator is coupled to receive the signal from the input sound transducer and to receive the sound detection flag from the local sound detector. The attenuator attenuates the signal from the input sound transducer when the sound detection flag is not activated. A sound processor is coupled to the controlled memory, and coupled to receive the sound detection flag from the local sound detector. The sound processor causes the controlled memory to store the audio information when the sound detection flag is activated. The sound processor retrieves and renders the stored audio information when the sound detection flag is inactive after being active.

In another embodiment, a device includes:
  means for storing a received audio information stream;
  means for activating a sound detection flag following detection of locally generated sound;
  means for muting output based on the received audio information stream in response to the activating the sound detection flag;
  means for saving rendering status of the received audio information stream, in response to the activating the sound detection flag, to reduce loss of audio information; and
  means for rendering at least a portion of the stored received audio information stream following inactivating the sound detection flag.

In still another embodiment, a device includes:
a processor; and
a memory coupled to the processor, the memory having stored therein instructions wherein execution of the instructions by the processor generates a method comprising:
  storing a received audio information stream;
  activating a sound detection flag following detection of locally generated sound;
  muting output based on said received audio information stream in response to the activating the sound detection flag;
  saving rendering status of the received audio information stream, in response to the activating the sound detection flag, to reduce loss of audio information; and
  rendering at least a portion of the stored received audio information stream following inactivating the sound detection flag.

A system includes a device couplable to a communication network. A device includes a local sound detector coupled to receive a signal from an input sound transducer. The local sound detector activates a sound detection flag upon detecting locally generated sound in the signal from the input sound transducer. A controlled memory is coupled to receive audio information from at least one remote facility. An attenuator is coupled to receive the signal from the input sound transducer and to receive the sound detection flag from the local sound detector. The attenuator attenuates the signal from the input sound transducer when the sound detection flag is not activated. A sound processor is coupled to the controlled memory, and coupled to receive the sound detection flag from the local sound detector. The sound processor causes the controlled memory to store the audio information when the sound detection flag is activated; and the sound processor retrieves and renders the stored audio information when the sound detection flag is inactive after being active.

A method for conversation like rendering of a stored audio information stream determines a first location in the stored audio information stream. The first location represents a point in time when the sound detection flag became active. The method next moves from the first location to a second location in the stored audio information stream. The second location is selected based upon a criterion to make playback of the stored audio information stream appear like actual conversation. Finally, the stored audio information stream is rendered starting with audio information stored at the second location.

In one embodiment, the move backs up in time in the stored audio information stream so that the audio information stored at the second location occurred before information stored at first location. Thus, the information stored at the second location was previously rendered and upon the rendering, the information stored at the second location is repeated.

In another embodiment, the move steps forward in time in the stored audio information stream so that audio information stored at the second location occurred after information stored at first location. Thus, audio information in the audio information stored from the first location up to the second location is skipped over and not rendered.

Hence, a computer program product has embedded therein executable instructions for a method including:
  determining a first location in the stored audio information stream where the first location represents a point in time when a sound detection flag became active;
  moving from the first location to a second location in the stored audio information stream wherein the second location is selected based upon a criterion to make playback of the stored audio information stream appear like actual conversation; and rendering the stored audio information stream starting with audio information stored at the second location.

BRIEF DESCRIPTION OF THE DRAWINGS

FIG. 4C illustrates the memory buffer of FIG. 4B with the read pointer moved back in time to produce a partial repetition of the rendered sound to make the play-back more conversation like.

FIG. 4D illustrates the memory buffer of FIG. 4B with the read pointer moved forward in time to produce rendered sound that makes the play-back more conversation like.

In the drawings and the detailed description, elements with the same reference numeral are the same or equivalent elements. Also, the first digit of a reference numeral for an element is the figure number of the drawing in which that element first appears.

DETAILED DESCRIPTION

Figure 1:
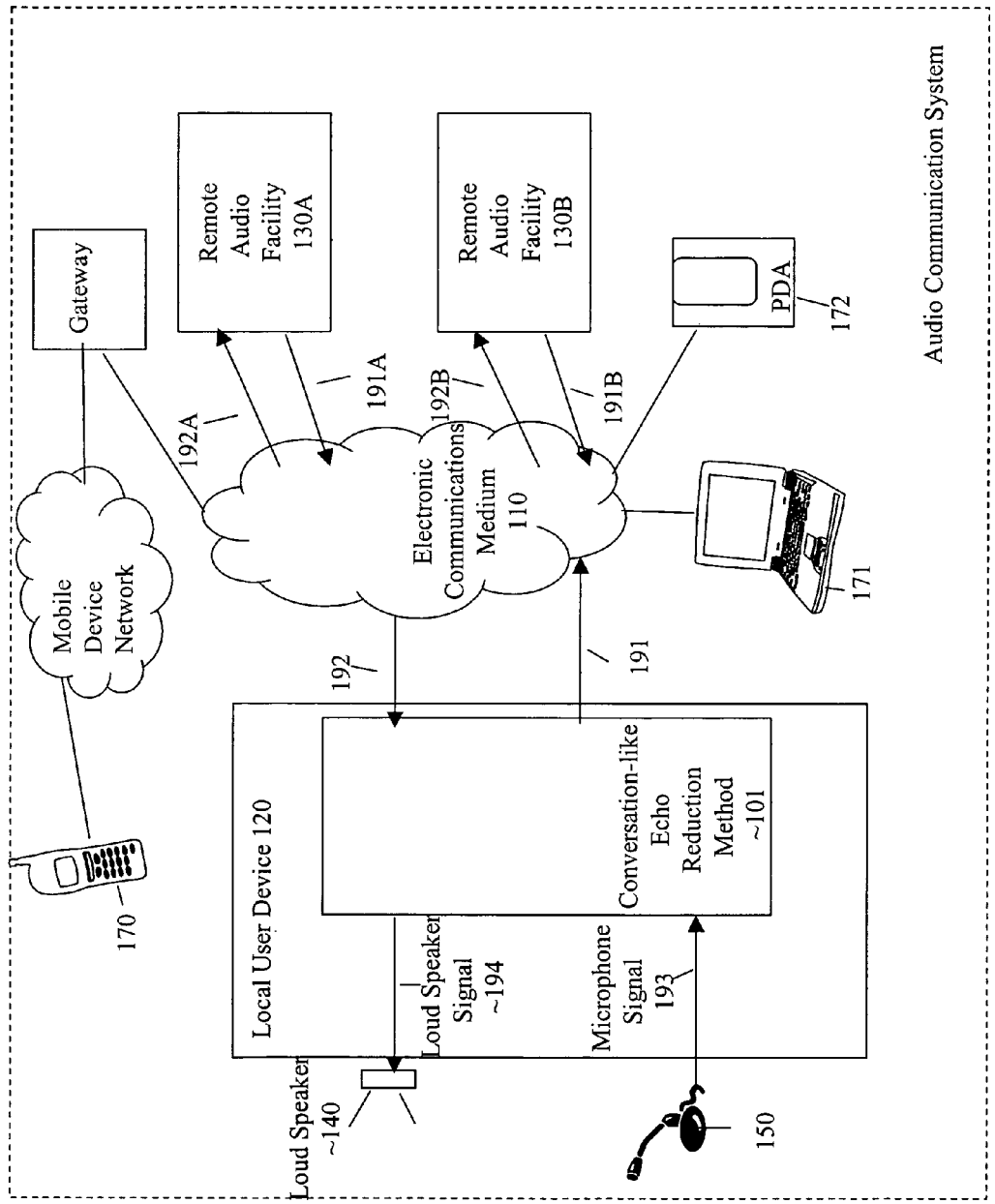
FIG. 1 is an illustration of a system that includes a local user device that utilizes a novel conversation-like echo reduction method according to one embodiment of this invention.

According to one embodiment of the present invention, the advantages of the simple half duplex solution are achieved without most of the loss of information due to double talk found in the prior art solution. In this embodiment, multiple parties carry on a normal conversation over a communications medium such as the Internet. A local party can speak over, e.g., interrupt, a remote party that is speaking. Specifically, a received signal representing audio information from the remote party that is being interrupted is saved. When the remote party is interrupted, the playback of the received signal is silenced by the detection of the locally generated sound, e.g., when a microphone signal is active due to the local party's interruption, but the saving of the received signal continues. In one embodiment, the saved signal is subsequently rendered starting at the point of interruption, e.g., played out, when the microphone signal is inactive except due to sound coupled to the microphone from the local loud speaker, e.g., the local party stops speaking so that no locally generated sounds are detected.

Thus, two people can talk at the same time, but no echoes are generated by a microphone picking up both the local party speaking and the sound from the loud speaker caused by the remote party speaking. When the local party stops talking, the local party hears the saved signals associated with the remote party talking.

In one embodiment, if the local party continues talking for a time such that the remote party would normally either repeat the information or start on a new topic, the saved information is flushed and not played back after the local party stops talking. Alternatively, if the local party only briefly interrupts, the playback of the saved signals, associated with the remote party talking, repeats a portion of what the remote party said earlier so that it appears to the local party that the remote party started over after being interrupted.

Unlike prior art systems, where when one person entered a conversation, the information from the other person or persons talking at the same time was lost, embodiments of the method and system of this invention permit more realistic conversations. Thus, a group of people using facilities 120, 130A, 130B coupled via an electronic communications medium 110, e.g., a network, such as the Internet, can talk with each other as if all were sitting in the same location.

Specifically, in this example, facility 120 is a local user device 120 that can be, for example, a personal computer executing conversation-like echo reduction method 101. Alternatively, local user device 120 can be any one of mobile telephone 170, portable computer 171, personal digital assistant 172, or any other device capable of performing method 101 as described herein. A user of at least one other facility, for example, any one of a plurality of remote facilities 130A to 130B, is carrying on a conversation with the user, sometimes called the local party, of local user device 120 over electronic communications medium 110.

Assume initially that the remote party, who is using remote audio facility 130A, is talking and that audio information is being transmitted from remote facility 130A in signal 191A. Signal 191A is being sent over electronic communications network 110 to each of the facilities (a) that are connected to electronic communications network 110 and (b) that are being used by the parties to converse within the conversation of this example.

Local user device 120 receives transmitted signal 191A as received signal 192. The audio information in received signal 192 is processed by conversation-like echo reduction method 101.

Assuming the local party, who is using local user device 120, is not talking, the audio information in received signal 192 is rendered and sent to loud speaker 140 as loud speaker signal 194. Thus, the local party hears the remote party, who is using remote audio facility 130A.

When the local party decides to interrupt the remote party and starts talking, conversation-like echo reduction method 101 detects the locally generated sound. In response to detecting the locally generated sound, method 101 marks the point in saved audio information from incoming signal 192 that the interruption occurred, mutes loud speaker signal 194, and transmits the locally generated audio information in signal 191.

Since loud speaker signal 194 is muted, signal 191 includes only locally generated sounds. Thus, echoes sent to remote facilities 130A, 130B are suppressed. Unlike prior art systems, the audio information in signal 192 is saved and when the locally generated sound terminates, conversation-like echo reduction method 101 renders the saved audio information and plays the rendered signals back via loud speaker 140. Consequently, any audio information from remote facilities 130A, 130B is not lost, but simply delayed until the local party stops speaking.

During the rendering of the saved audio information, any signal 193 from microphone 150 is strongly attenuated to reduce the sending of echo-like sounds from local user device 120. The rendering of the saved audio information is accelerated as necessary to catch up so that audio information in received signal 192 is rendered normally. Thus, unlike the prior art, which generated an echo when the audio communications system was receiving and sending at the same time, system 100 prevents echo generation as well as the loss of information when one party speaks while another party is speaking.

When it is stated herein that the audio information in received signal 192 is rendered, those of skill in the art understand that information in the received signal 192 that represents audio signals is extracted and rendered. For a given communications network, typically to provide communication between heterogeneous platforms, for example, heterogeneous computer platforms, a known protocol is used to transmit information over that communications network and the known protocol specifies the content and order of the information transmitted so that each computer platform can identify and process the portion of the information transmitted that represents the payload, which in this example is audio information.

Figure 2:
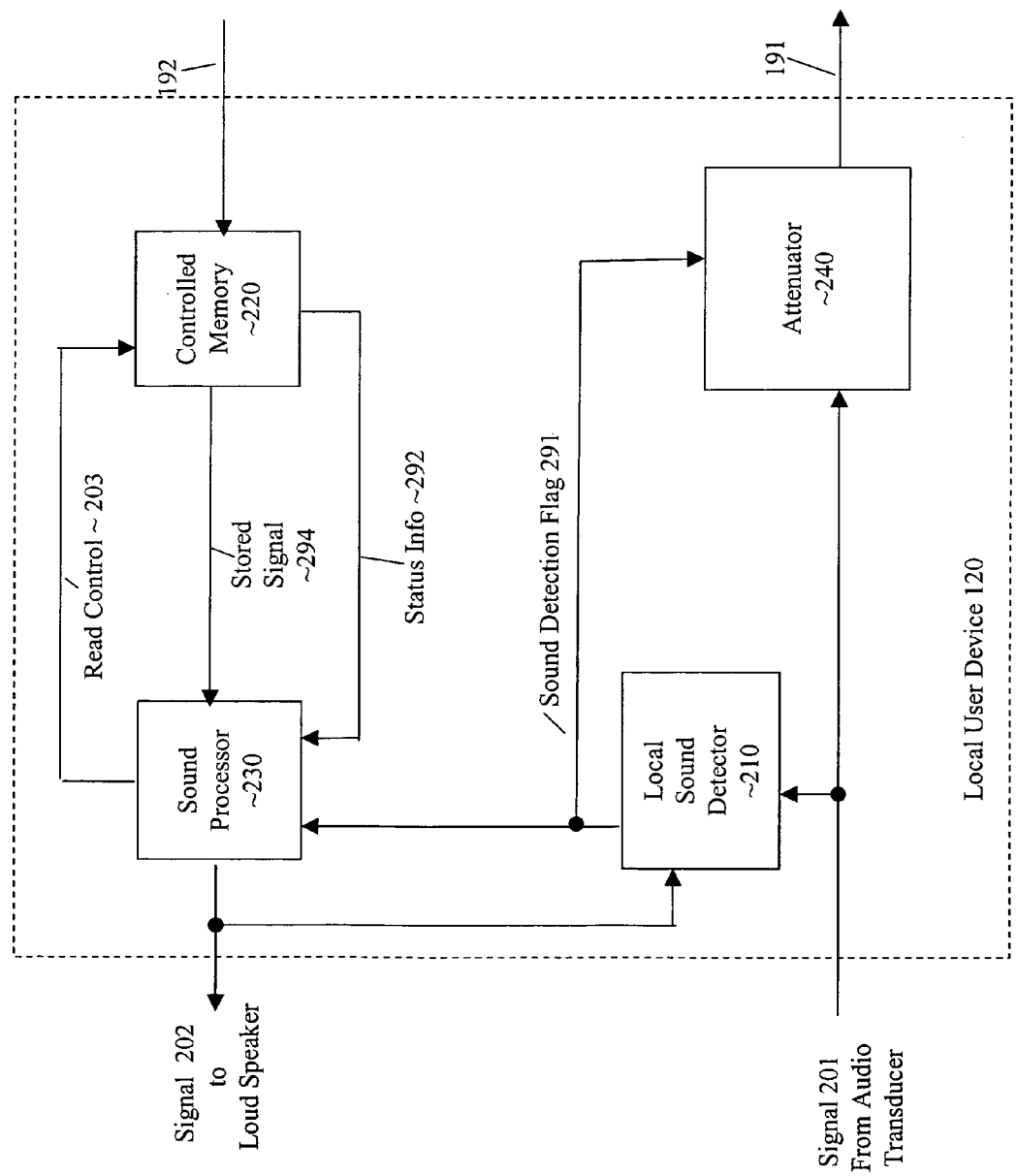
FIG. 2 is a more detailed illustration of the local user device of FIG. 1 according to one embodiment of this invention.

FIG. 2 illustrates one embodiment of local user device 120. When the local party begins to talk, an input sound transducer, such as a microphone 150 that generated microphone signal 193, generates a signal 201 that is supplied to a local sound detector 210 and to an attenuator 240 in local user device 120. Local sound detector 210 also receives an output signal 202, e.g., loud speaker signal 194 in local user device 120, from sound processor 230, which is sent to a loud speaker, or alternatively to a circuit driving a loud speaker.

Local sound detector 210 compares signal 201 with signal 202 to determine whether signal 201 is an echo of the sound generated from signal 202. Techniques for comparing signal 202 with signal 201 to determine whether signal 201 is simply an echo, a different source, or a combination of an echo and a different source are known to those of skill in the art. When a person or some other source of sound of interest other than that generated by signal 202 is detected by local sound detector 210, local sound detector 210 activates a sound detection flag 291 that is supplied to attenuator 240 and sound processor 230.

In one embodiment, when sound detection flag 291 is active, signal 201 from a microphone is passed through attenuator 240 without attenuation and transmitted in signal 191 by local user device 120 to the Internet or other communications medium that in turn sends the signal to one or more remote destinations. In another embodiment, local user device 120 is coupled to another device that generates signal 191 in response to receiving a signal corresponding to signal 201.

At those remote destinations, there may be user terminals similar to local user device 120 or other audio facilities such as voice enabled database systems. Some of the user terminals at these remote destinations may employ an implementation of the novel conversation-like echo reduction method 100 described herein, may employ alternative echo reduction methods, or may possibly employ no echo reduction methods at all.

Following receipt of the active sound detection flag signal 291, sound processor 230 causes a signal 202 to the loud speaker of local user device 120 to be interrupted and causes read control signal 203 to controlled memory 220 to be driven active. In response to active read control signal 203, controlled memory 220 marks a location, where the interruption occurred, in temporarily stored audio information in incoming signal 192 from a remote location. For example, controlled memory 220 queues incoming packets in signal 192 representing the audio information behind previously built up and not yet rendered packets and controlled memory 220 saves a value of a read pointer to the queue when the interruption occurs, e.g., the location in the queue storing audio information that was being read and rendered at the time of the interruption.

Note that while herein a packet is used to represent a quantity of audio information, this is illustrative only and is not intended to limit the invention to applications that utilize a communication protocol that includes packets. In view of this disclosure, one of skill in the art will know where the audio information is within a particular incoming data stream and can save and process that audio information according to the principles of an appropriate embodiment of this invention.

Subsequently, when the local party ceases talking, local sound detector 210 deactivates sound detection flag signal 291. The deactivation of sound detection flag signal 291 causes a cessation of the sending of signal 201 to the remote locations, or at least causes an increased attenuation of the signal before sending by attenuator 240. When sound processor 230 detects the deactivation of sound detection flag signal 291, sound processor 230 determines the quantity of packets stored in controlled memory 220 by examining status information 292 from controlled memory 220. Status information 292 can include, for example, read and write pointers to a circular buffer.

If, upon initial examination, the quantity of stored audio information exceeds a preset threshold, e.g., an acceleration threshold, sound processor 230 begins rendering the stored audio information in an accelerated manner, in one embodiment. In other embodiments, acceleration is not used and the audio information is rendered in the normal manner.

Several methods are known to achieve acceleration of speech signals with slight degradation. One acceleration method is to shorten gaps and pauses. Another acceleration method is to delete portions of about 10 milliseconds from time to time. Another method is to estimate the duration of pitch epochs and delete single pitch epochs from time to time. Another method is to implement a pulse excited analysis-synthesis system and omit pitch epochs from both the excitation sequence and the stream of model parameters. These acceleration methods, and others, used individually and in combination are well known in the art and can be utilized in method 101.

When the quantity of audio information built up in controlled memory 220 drops below a second, possibly different, threshold, sound processor 230 ceases acceleration or alternatively reduces the acceleration, if acceleration was used, and simply renders the remaining built up audio information in a normal manner or at a slower acceleration. If local user device 120 of this example is simultaneously receiving audio information from two or more remote locations, in one embodiment, each audio information stream is individually stored and subsequently accelerated individually, if necessary, and then mixed to form output signal 202.

As discussed above, many methods are known for the acceleration of signals representing sounds with small damage to the naturalness or intelligibility of the sounds. In, one embodiment, naturalness and intelligibility are further promoted by backing up and replaying the signal representing sound fragments slightly preceding the point at which the loud speaker signal was interrupted. Favorable restarting points for speech include pauses or pauses connecting sections with significant pitch changes. A speech understanding method may be used to detect phrase or sentence beginnings that in turn can be used as restarting points.

Many acceleration methods can be expected to perform with greater naturalness when the individual audio information streams are accelerated separately. For example, the pauses in one talker's voice may occur at different moments than the pauses in another talker's voice. Consequently less shortening of the pauses in each individual voice is required for a given acceleration factor than the shortening of infrequent coincident pauses in both voices. A speech understanding method may be used to detect and discard sentence restarts such as "I think, . . . I think so."

If the quantity of stored audio information approaches the storage space available, in one embodiment, the acceleration and mixing steps are performed while the audio information streams are still in storage. This allows a reduction of the quantity of data that must be retained.

For each audio information stream, in some embodiments, if the quantity of stored audio information approaches the storage space available, or if the oldest stored audio information is decided to be too old by some criterion, the oldest stored audio information is discarded without rendering.

Figure 3:
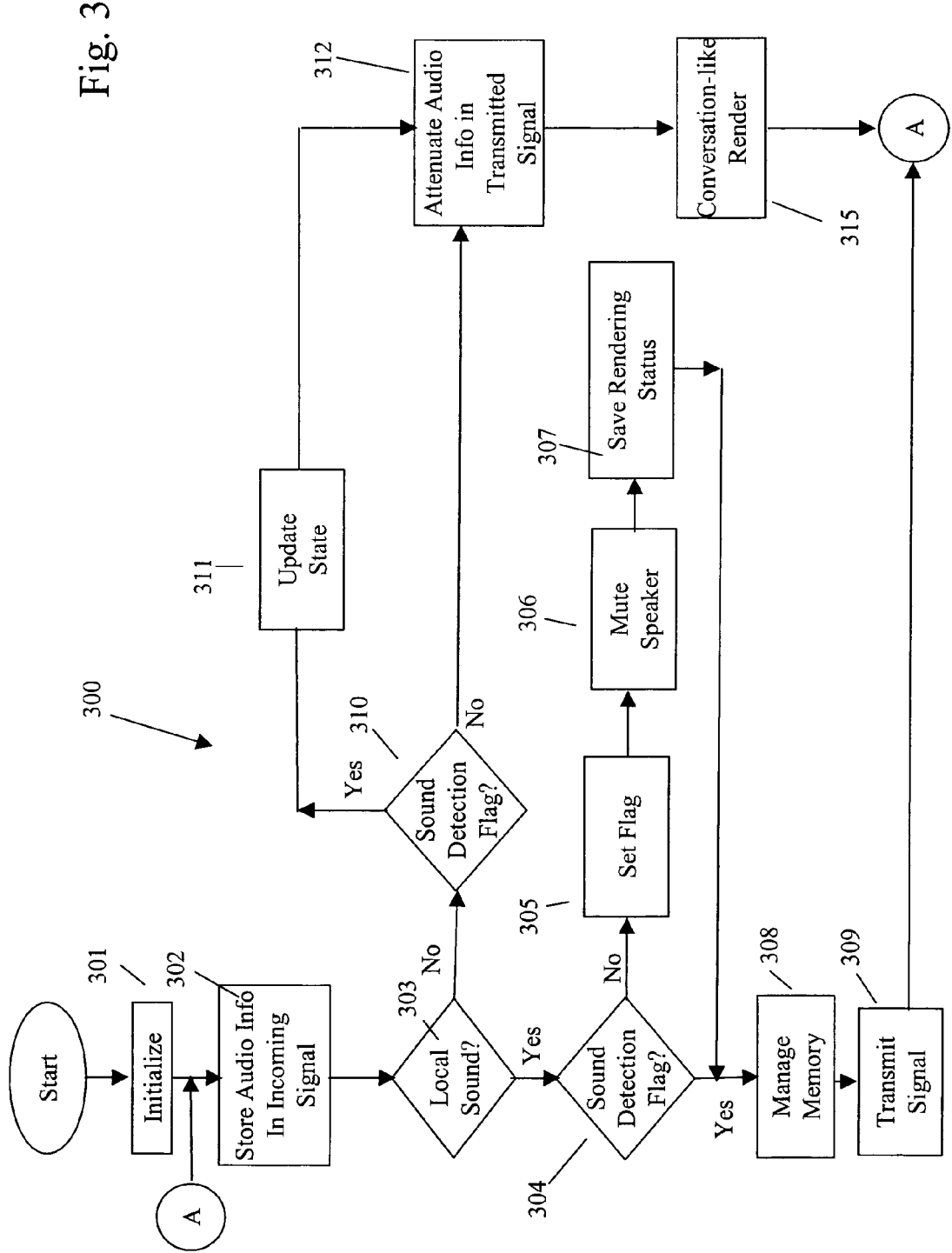
FIG. 3 is an illustration of a process flow diagram for the conversation-like echo reduction method according to one embodiment of this invention.

FIG. 3 is a method 300 that is one embodiment of conversation-like echo reduction method 101. Initially, in initialize operation 301, various flags and thresholds are initialized. As explained more completely below, in one embodiment, a sound detection flag is set inactive. In one embodiment, an acceleration threshold is initialized for each remote party in the conversation. Also, (i) buffer memory for storing the incoming audio information stream and (ii) pointers, etc. required for management of the buffer memory are initialized. Following completion of initialize operation 301, processing transfers to store audio information in incoming signal operation 302.

Store audio information in incoming signal operation 302 stores the audio information in the incoming signals from each remote party to the conversation. In one embodiment, initially, the audio information for each remote party is stored in a separate buffer memory, which, for example, is managed as a circular buffer. In this embodiment, operation 302 stores the current information at the location of a write pointer and moves the write pointer to the next storage location in the buffer. Store audio information in incoming signal operation 302 transfers processing to local sound check operation 303.

Local sound check operation 303 determines whether sound is being generated locally, e.g., the local party is speaking. In the embodiment of FIG. 2, local sound detector 210 performs check operation 303.

As indicated above, the detection of locally generated sound can be done in a number of ways in local sound check operation 303. For example, in one embodiment, the local party manually activates a push to talk switch. In another embodiment, the signal from the microphone is compared with the loud speaker signal and the signal from the microphone is compared with the loud speaker signal at earlier times. If the current comparison is different from the comparison at earlier times, it is an indication of locally generated sound.

In still yet another embodiment of detecting locally generated sound, estimated ratios of energy levels at selected frequencies are used to detect locally generated sound. Such ratios are used for example in some adaptive echo cancellers and so are known to those of skill in the art. In a further embodiment, estimates of pitch components of human speech are used to detect locally generated sound. Any one or a combination of theses technique can be used in local sound check operation 303. If no sound was being generated locally, local sound check operation 303 transfers processing to sound detection flag state check operation 310.

If the sound detection flag is set, sound detection flag state check operation 310 transfers to update state operation 311. Conversely, if the sound detection flag is not set, check operation 310 transfers processing to attenuate audio information in transmitted signal operation 312. Update state operation 311 clears sound detection flag 291, un-mutes the loud speaker, and then transfers to attenuate audio information in transmitted signal operation 312.

Attenuate audio information in transmitted signal operation 312 causes a cessation of the sending of audio information in signal 201 to the remote locations, or at least causes an increased attenuation of the audio information in signal 201, by attenuator 240, before sending. Operation 312 transfers processing to conversation-like render operation 315.

As explained above, conversation-like render operation 315 retrieves the stored audio information, accelerates the information if necessary and implemented, and generates signal 202. One embodiment of conversation-like render operation 315 is presented in FIG. 4, which is explained more completely below. Upon completion of conversation-like render operation 315, processing transfers to store audio information in incoming signal operation 302.

The above sequence through operations 310, 311, 312, and 315 was done when local sound check operation 303 failed to detect locally generated sound. If local sound check operation 303 detected locally generated sound, check operation 303 transfers processing to sound detection flag check operation 304.

Sound detection flag check operation 304 determines whether the sound detection flag is set. If the sound detection flag is set, processing transfers to manage memory operation 308 and otherwise to set flag operation 305.

Set flag operation 305 sets the sound detection flag and transfers to mute speaker operation 306. Mute speaker operation 306 mutes the output based on the audio information stream received from the remote facility. If multiple audio information streams are being received, all are muted. Mute speaker operation 306, in one embodiment, attenuates the signal to the loud speaker. More generally, as used herein, muting output based on the audio information stream received from a remote facility includes, for example, either attenuating the signal, interrupting the signal using some other means, stopping rendering of the received audio information stream, any combination of these, or any other technique to reduce the sound generated based on the received audio information stream.

Mute speaker operation 306 transfers processing to save rendering status operation 307. If operation 306 ceases rendering, the read pointer at the cessation marks point of the interruption and so operation 307 does not need to save the read pointer. However, if the loud speaker is muted without ceasing rendering, operation 307 saves the value of the read pointer at the time of the interruption so that rendering can be restarted relative to the location of the interruption. Operation 307 also saves any other rendering information needed to restart rendering at a later time. Save rendering status operation 307 transfers processing to manage memory operation 308.

As explained more completely below, if sufficient storage space is available, the stream of received audio information from each remote facility is stored separately. However, if the storage space is limited or nearly full, the incoming streams can be mixed and the mixed stream stored, or alternatively, each incoming stream can be accelerated, the accelerated streams mixed and the mixed stream stored in manage memory operation 308.

In still yet another embodiment, if the memory becomes full, the stored streams can be mixed and the mixed stream stored in place of the individually stored streams, or alternatively, each stored stream can be accelerated, the accelerated streams mixed and the mixed stream stored in place of the individually stored streams in manage memory operation 308. This permits having sufficient memory available to save each new incoming audio stream separately. Thus, the older audio information will be rendered with less accuracy, while the more timely audio information will be rendered in the real-time conversation mode.

One embodiment of manage memory operation 308 is described more completely below. Upon completion of manage memory operation 308, processing transfers to transmit signal operation 309.

Transmit signal operation 309 sends the locally generated sound over the network, as described above. Upon completion of operation 309, processing transfers to store audio information in incoming signal operation 302.

The linear sequence of operations presented in FIG. 3 is used to facilitate understanding of method 300 and is not intended to limit the invention to this specific sequence. For example, the various check operations may not be performed on each pass through method 300. Rather, the check operations could be implemented as events, and when an event handler detects a particular event, e.g., locally generated sound, processing transfers to the appropriate point in method 300. Also, when appropriate, operations can be performed in parallel rather than serially as shown in FIG. 3. Thus, method 300 can be implemented to be compatible with the hardware, firmware, software, etc. on a particular platform such a user terminal, etc.

Figure 4A:
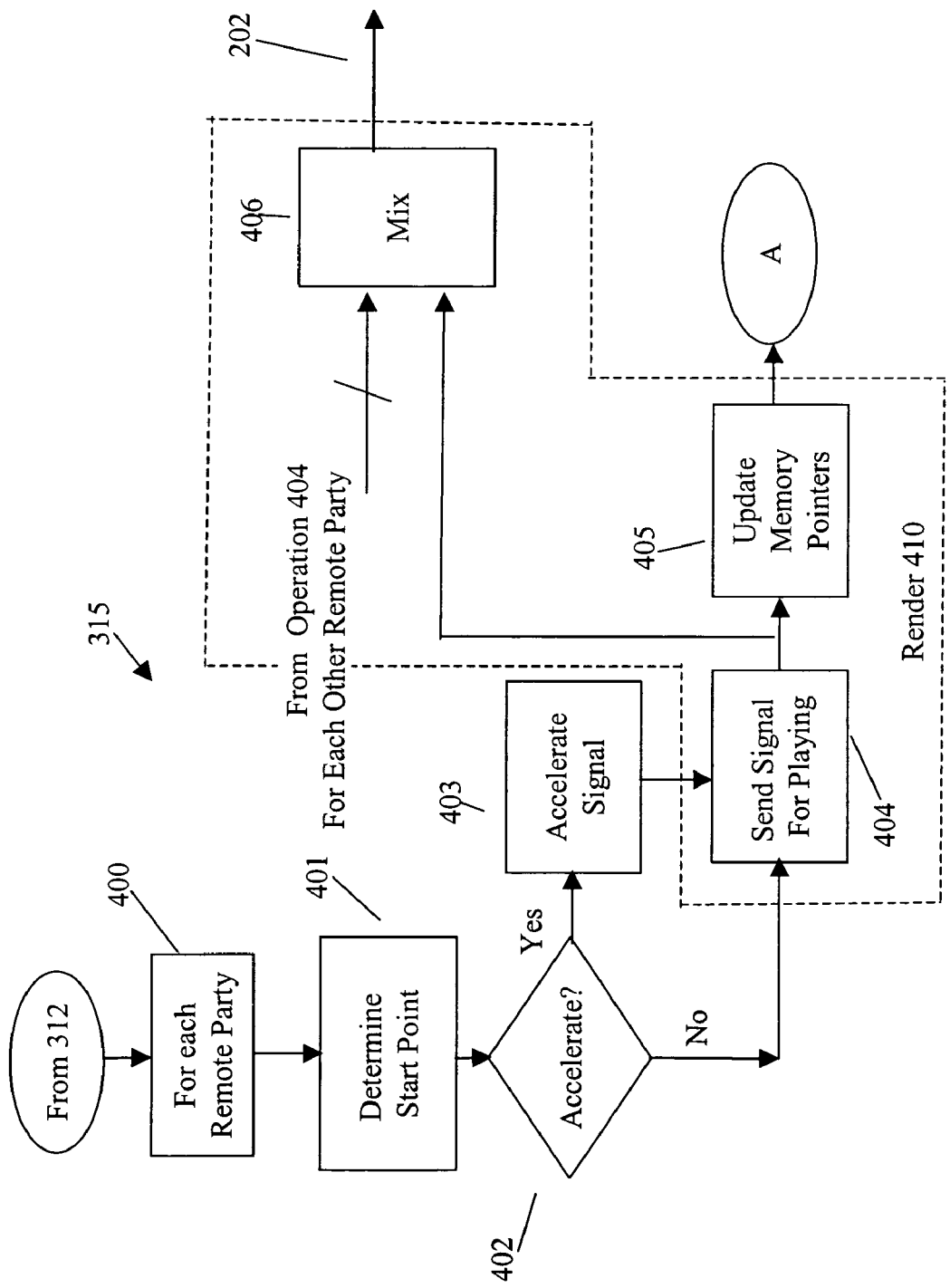
FIG. 4A is a more detailed process flow diagram for the conversation-like render operation of FIG. 3, according to one embodiment of the invention.

FIG. 4A is a process flow diagram for one embodiment of conversation-like render operation 315. Operation 400 (FIG. 4A) performs operations 401 to 405 for each remote party, i.e., for each saved stream of audio information or each stream of audio information from a remote party. If the stored audio information has been previously combined, there is in effect only a single remote party.

Determine start point operation 401 determines the start point for rendering of a stored stream of audio information. A read pointer 451 (FIG. 4B) points to the next portion of the audio information to be rendered. If a remote party was interrupted, read pointer 451 points to location 12 of audio information that would have been read and rendered next if the remote party had not been interrupted. In this embodiment, the buffer memory for the remote facility has 256 storage locations. The next portion of audio information received from the remote facility is stored starting at the location addressed by the write pointer.

Figure 4B:
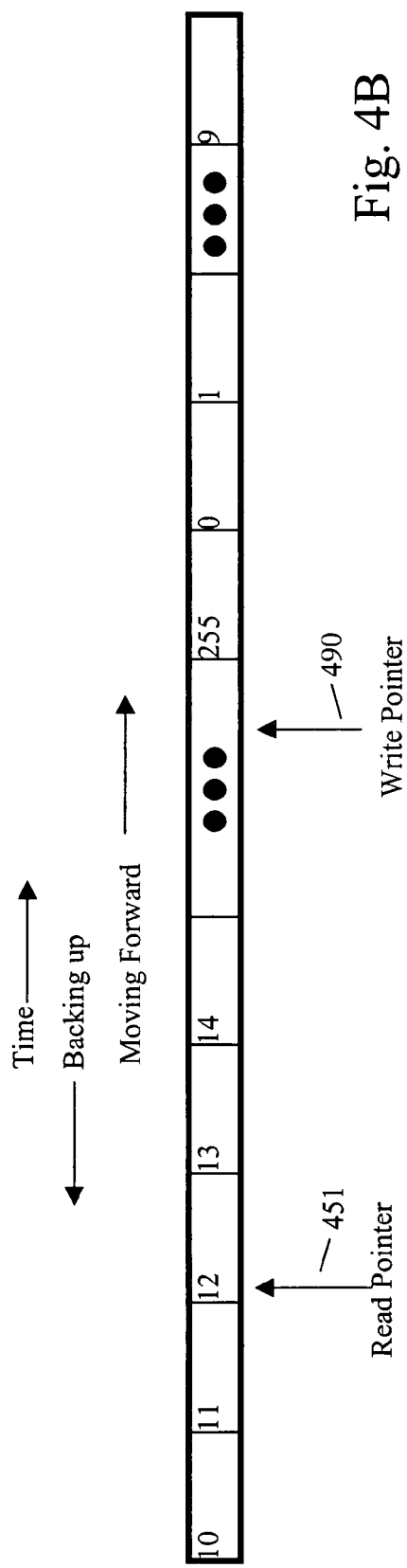
FIG. 4B illustrates a memory buffer storing audio information with a read pointer and a write pointer.
Figure 4C:
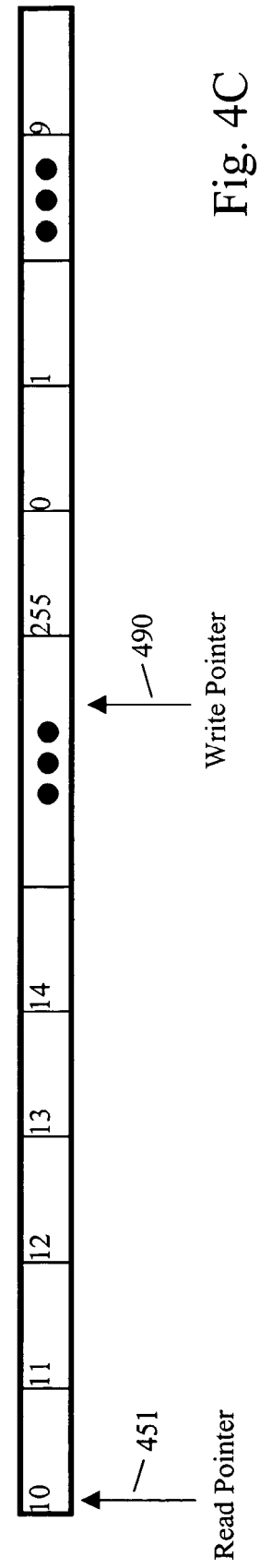
Figure 4D:
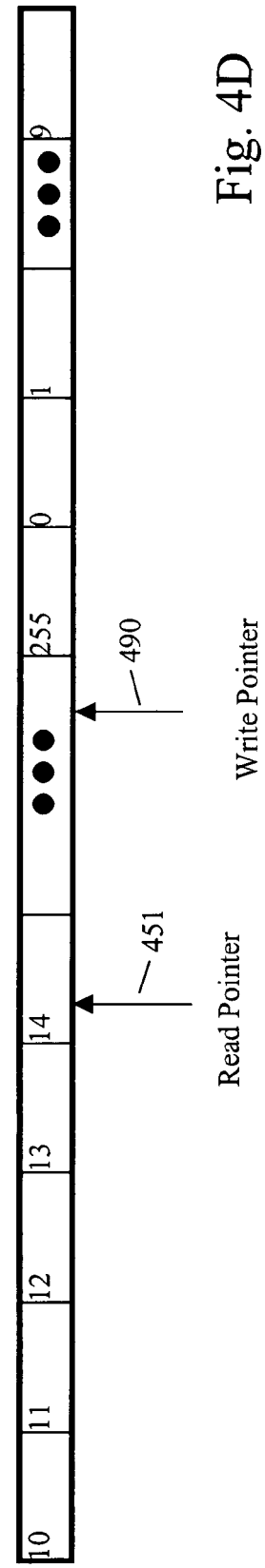

Operation 401 may leave read pointer 451 unchanged as in FIG. 4B, or alternatively, read pointer 451 may be moved back in time to memory location 10 preceding location 12 storing the audio information being rendered when the interruption occurred as in FIG. 4C. In one embodiment, the audio information stored at location 10 contained the last pause preceding the interruption. Thus, read pointer 451 is moved back in time to point to location 10 and the audio information stored at location 10 is processed, e.g., the processing is moved back to the most recent pause in the audio information stream prior to the interruption. This will give a more natural flow to the play back of the stored audio stream because when someone is interrupted, the person typically starts speaking again by repeating the information stated prior to the interruption.

In another embodiment, read pointer 451 is moved back in time to a specific pause, i.e., a pause connecting portions of the stored audio information stream with significant pitch changes. Alternatively, a speech understanding method may be used to detect phrase or sentence beginnings that in turn can be used as restarting points, i.e., operation 401 moves read pointer 451 back in time to a start of a phrase or a start of a sentence.

In still yet another embodiment, the decision to (a) back up read pointer 451 to an earlier location 10 (FIG. 4C) in the audio information stream, (b) leave read pointer 451 unchanged (FIG. 4B), or (c) move read pointer 451 forward in time to a more recent location 14 in the audio information stream (FIG. 4D) is based on the length of the interruption. For example, if the interruption is just the injection of a brief comment, as "I understand," "Okay," etc., the interrupted remote party is likely to continue so that moving the starting point back would not be necessary, i.e., the location addressed by read pointer 451 is not changed.

If the interruption is longer than the time required for injection of brief comment but shorter than the time required for the audio information stored at the current location to become stale, read pointer 451 is moved back in time as described above.

If the interruption is of sufficient length that the audio information stored at location 12 becomes stale, i.e., the length of the interruption is such that the remote party would not repeat, but would continue on with the current topic, read pointer 451 is moved forward in time. If the interruption is so long that the remote party would move on to a new topic, read pointer 451 is moved forward to the location of write pointer 490 and so the stale audio information is flushed. In one embodiment, the flush operation is not included in operation 401, but rather is included in manage memory operation 308, as described more completely below and operation 401 performs as if the remote party had just started speaking.

Best values for parameters such as the elapsed time for the forward movement, rather than backward movement, of read pointer 451 may depend upon: (a) number of participants in the conversation; (b) electronic communication medium's delay; (c) speaking rates; (d) social contexts; or (e) other variables. The best values for the parameters typically are determined based upon empirical studies of conversations to provide realistic interactions. Automatic speech understanding systems may be employed to alter such parameters dynamically during a given conversation. The parameters needed for voice over IP conversations would be different from those needed using an office speaker phone and from those needed for extraterrestrial communications.

In each of these embodiments, determine start point 401 positions a read pointer, as needed, to address a location in the stored stream of audio information that is to be rendered next. Upon completion, operation 401 transfers processing to accelerate check operation 402.

Accelerate check operation 402 determines whether acceleration is desired. In this embodiment, acceleration is desired if a quantity of stored audio information exceeds the acceleration threshold. Note that the acceleration threshold can be zero. Also, acceleration can be performed either after an interruption or when processing of the stored audio information falls behind the location of the write pointer by more than the acceleration threshold. If the acceleration threshold is exceeded, check operation 402 transfers processing to accelerate signal operation 403, and otherwise transfers processing to send signal for playing operation 404.

Accelerate signal operation 403 accelerates the audio information using, for example, one of the techniques described above. Upon completion, operation 403 transfers processing to send signal for playing operation 404.

Send signal for playing operation 404 converts the stored audio information into a signal that can be forwarded to mix operation 406. Send signal for playing operation 404 sends the signal to mix operation 406 and transfers processing to update memory pointers operation 405.

Mix operation 406 receives the signals from each of the parties to the conversation, mixes the signals together and in turn generates the signal that is transmitted to the loud speaker for play back.

Update memory pointers operation 405, moves the read pointer to the next storage location, which completes operation 315. Thus, in this embodiment, each of the audio streams is accelerated individually, and then mixed for playback.

In this embodiment, operations 404, 405, and 406 are included in render operation 410. This is illustrative only and is not intended to limit the rendering used in this invention to this specific embodiment. In view of this disclosure and a particular local user device 120, one of skill in the art can determine the operations necessary to render the information.

Figure 5:
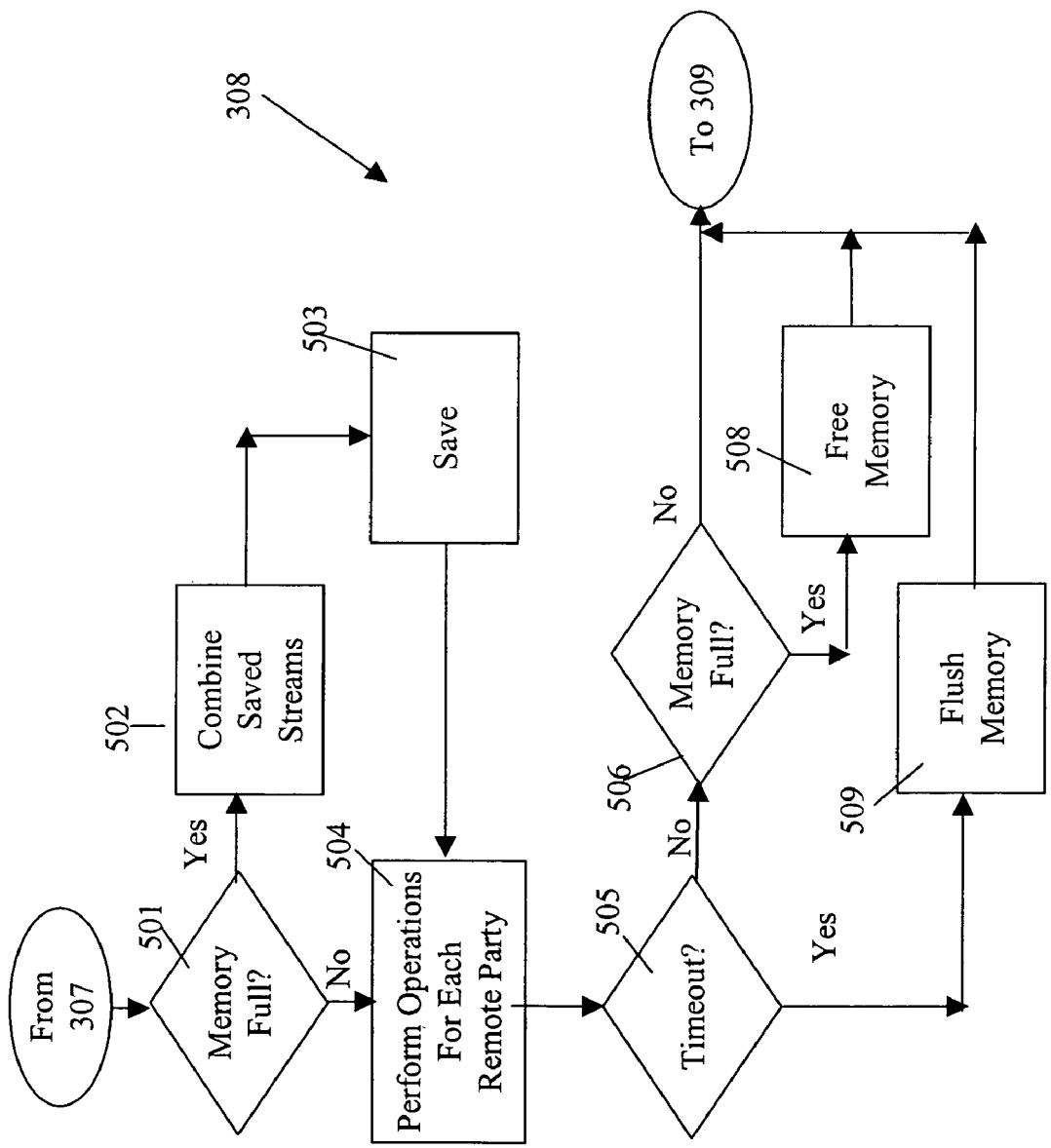
FIG. 5 is a more detailed process flow diagram for the manage memory operation of FIG. 3, according to one embodiment of the invention.

FIG. 5 is a more detailed process flow diagram for one embodiment of manage memory operation 308. In this embodiment, a memory full check operation 501 determines whether storage space used for storing received audio information streams has reached a point where the memory is considered full, e.g., the percentage of used memory has reached a high water mark. If the memory used for storing the received audio information streams is greater than or equal to the high water mark, check operation 501 transfers to combine saved streams operation 502 and otherwise to perform for each send operation 504.

The purpose of combine saved streams operation 502 is to reduce the amount of memory used for storing the received individual streams of audio information. In one embodiment, the stored received individual streams of audio information are retrieved, mixed, and the mixed stream of audio information is stored in place of the received individual streams of audio information in save operation 503. In another embodiment, the mixed stream of audio information is accelerated and the accelerated mixed stream of audio information is stored in place of the received individual streams of audio information in save operation 503.

In still yet another embodiment, each individual stream of stored audio information is retrieved and accelerated. The accelerated streams of audio information are mixed, and the mixed accelerated stream of audio information is stored in place of the received individual streams of audio information in save operation 503. In each embodiment, after the individual streams of stored audio information are combined in operation 502, operation 503 updates the status information so the multiple saved individual streams are replaced by the single combined stream for subsequent rendering.

Various alternatives are available in combine save streams operation 502. For example, operation 502 could combine data that is older than a predetermined time, and leave data that is younger than the predetermined time uncombined.

Alternatively, combine operation 502 could combine one subset of the stored received audio information streams, while leaving another subset of the stored received audio information streams uncombined. For example, if there are five stored received audio information streams and two of the five streams are using 95% of the available memory. The two streams could be combined and the other three left uncombined. Upon completion of operations 502 and 503, processing transfers to perform operation for each remote party operation 504.

In this embodiment, a received stream of audio information is saved for each remote party and so operations 505 to 509 are performed for each remote party. In this embodiment, timeout check operation 505 compares the write pointer to the read pointer. If the difference between these two pointers is greater than a timeout threshold, processing transfers to flush memory operation 509, and otherwise to memory full check operation 506. The timeout threshold is empirically determined to emulate actual conversation, e.g., information more than 30 seconds old is considered stale and deleted. While here a difference in pointers is used, other techniques can be used to determine a timeout, e.g., a timer, a difference in time stamps, etc.

Flush memory operation 509 advances the read pointer to skip over the old stored audio information. Flush memory operation 509 transfers to transmit signal operation 309.

If timeout check operation 505 determines that a timeout did not occur, memory full check operation 506 determines whether the FIFO is becoming full. Memory full operation 506 compares the write pointer with the top of stack pointer in this embodiment. If the difference between the pointers is less than or equal to a predetermined buffer full threshold, processing transfers to free memory operation 508 and otherwise to transmit signal operation 309.

Free memory operation 508 moves the bottom of stack pointer and the top of stack pointer up a predetermined number of storage locations. This effectively drops the oldest information while providing additional storage space. If the read pointer is below the new location of the bottom of stack pointer, the read pointer is set equal to the bottom of stack pointer. Free memory operation 508 transfers processing to transmit signal operation 309.

The above description of operation 308 is illustrative only and is not intended to limit the invention to this specific sequence of operations. In view of this disclosure, one of skill in the art can implement a memory management scheme that flushes old audio information, and drops a portion of the stored audio information to provide additional storage space as needed.

In the above embodiments, conversation-like echo reduction method 101 was implemented on local user device 120. Again, this is illustrative only and is not intended to limit the invention to these specific embodiments. In view of this disclosure, the local user device could be a network connected device that is capable of receiving and playing a stream of audio information and transmitting locally generated sound such as PDA 172, mobile telephone 170, portable computer 171, a duplex radio system (not shown), or a speaker equipped telephone.

Conversation-like echo reduction method 101 could be implemented on a server computer for each party. Alternatively, part of the method could be performed on the user device and part on the server computer. For example, the local terminal could generate the state of the sound detection flag, and transmit the state of that flag to the server that in turn stored the audio information streams, and then retrieved, accelerated and mixed the audio information streams for that user device.

Herein, a computer program product comprises a medium configured to store or transport computer readable code for all or any part of method 101. Some examples of computer program products are CD discs, DVD discs, ROM cards, flash memory cards, floppy discs, magnetic tapes, computer hard drives, servers on a network and signals transmitted over a network representing computer readable program code. In one embodiment, a non-transitory tangible computer product comprises a tangible storage medium configured to store computer readable code for all or any part of method 101. Some examples of non-transitory tangible computer program products are CD discs, DVD discs, ROM cards, flash memory cards, floppy discs, magnetic tapes, computer hard drives, and servers on a network or any other tangible storage medium.

This storage medium may belong to local user device 120 itself. However, the storage medium also may be removed from local user device 120. For example, the instructions for method 101 may be stored in a memory that is physically located in a location different from device 120. The only requirement is that sound processor 230 is coupled to the memory. This could be accomplished in a client-server system, or alternatively via a connection to another computer via modems and analog lines, or digital interfaces and a digital carrier line.

In one embodiment, sound processor 230 is a combination of a processor on local user device 120, and executable instructions stored in one of memories described above. Alternatively, sound processor 230 can be implemented using an application specific integrated circuit or a special purpose processor.

Herein, a computer memory refers to a volatile memory, a non-volatile memory, or a combination of the two. Similarly, a computer input unit and a display unit refers to the features providing the required functionality to input the information described herein, and to display the information described herein, respectively, in any one of the aforementioned or equivalent devices.

In view of this disclosure, method 101 can be implemented in a wide variety of configurations that include the elements of FIG. 2, for example. In addition, method 101 could be stored as different modules in memories of different devices. For example, instructions for method 101 could initially be stored in a server computer, and then as necessary, a module of method 101 could be transferred to a local user device 120 and executed on device 120. Consequently, part of method 101 would be executed on the server processor, and another part would be executed on sound processor 230 of client device 120. In view of this disclosure, those of skill in the art can implement the invention in a wide-variety of physical hardware configurations using an operating system and computer programming language of interest to the implementer.

This application is related to commonly filed and commonly owned U.S. patent application Ser. No. 11/502,809, entitled "A STRUCTURE AND METHOD FOR ECHO REDUCTION WITHOUT LOSS OF INFORMATION" of James H. Parry filed on Aug. 11, 2006, which is incorporated herein by reference in its entirety.

I claim:

1. A method for rendering of a stored audio information stream of a remote party comprising:
   determining, automatically by the method, a first location in the stored audio information stream of the remote party,
      wherein a pointer points to the first location, and
      wherein the first location represents a point in time when a sound detection flag became active during rendering of the audio information stream of the remote party, wherein the sound detection flag is activated when an indication is received of at least one of (i) a local user wants to talk and (ii) locally generated sound is detected;
   selecting, automatically by the method following the determining and following the sound detection flag going active that indicates an interruption of the remote party, a second location in the stored audio information stream based on characteristics of the stored audio information stream;
   moving, automatically by the method following the selecting, the pointer from first location to the second location in the stored audio information stream; and
   rendering the stored audio information stream starting with audio information stored at the second location and pointed to by the pointer, wherein during the rendering of the stored audio information stream, echo is reduced by attenuating an audio output signal of the audio information stream from a device of said local user.

2. The method of claim 1 wherein the moving comprises:
   backing up in time the pointer to the stored audio information stream wherein the audio information stored at the second location occurred before information stored at the first location so that the audio information stored at the second location was previously rendered and upon the rendering, the audio information stored at the second location is repeated.

3. The method of claim 1 wherein the moving comprises:
   moving forward in time the pointer to the stored audio information stream wherein the audio information stored at the second location occurred after the audio information stored at first location so that audio information in the stored audio information from the first location up to the second location is skipped over and not rendered.

4. The method of claim 1 further comprising:
   comparing a microphone signal to a loud speaker signal at earlier times to detect locally generated sound; and
   activating the sound detection flag when the comparing indicates that the locally generated sound is detected.

5. The method of claim 4 wherein the comparing comprises estimating ratios of energy levels at selected frequencies.

6. The method of claim 4 wherein the comparing comprises estimating pitch components of human speech.

7. The method of claim 1, wherein the stored audio information stream is one of a plurality of stored received audio information streams, and the method further comprising:
   mixing others of the plurality of stored received audio information streams with the stored audio information stream prior to the rendering.

8. The method of claim 1 including accelerating the stored audio information stream.

9. The method of claim 8 wherein the accelerating is performed prior to the rendering.

10. A non-transitory tangible computer program product having embedded therein executable instructions for a method comprising:
   determining, automatically by the method, a first location in a stored audio information stream of a remote party, wherein a pointer points to the first location, and
      wherein the first location represents a point in time when a sound detection flag became active during rendering of the audio information stream of the remote party, wherein the sound detection flag is activated when an indication is received of at least one of (i) a local user wants to talk and (ii) locally generated sound is detected;
   selecting, automatically by the method following the determining and following the sound detection flag going active that indicates an interruption of the remote party, a second location in the stored audio information stream based on characteristics of the stored audio information stream;
   moving, automatically by the method following the selecting, the pointer from the first location to the second location in the stored audio information stream; and
   rendering the stored audio information stream starting with audio information stored at the second location and pointed to by the pointer, wherein during the rendering of the stored audio information stream, echo is reduced by attenuating an audio output signal of the audio information stream from a device of said local user.

11. A device comprising:
means for automatically determining a first location in a stored audio information stream of a remote party, wherein a pointer points to the first location, and
wherein the first location represents a point in time when a sound detection flag became active during rendering of the audio information stream of the remote party, wherein the sound detection flag is activated when an indication is received of at least one of (i) a local user wants to talk and (ii) locally generated sound is detected;
means for automatically selecting, following the sound detection flag going active that indicates an interruption of the remote party, a second location in the stored audio information stream based on characteristics of the stored audio information stream;
means for automatically moving the pointer from the first location to the second location in the stored audio information stream; and
means for rendering the stored audio information stream starting with audio information stored at the second location and pointed to by the pointer, wherein during the rendering of the stored audio information stream, echo is reduced by attenuating an audio output signal of the audio information stream from the device.

12. A method for rendering of a stored audio information stream of a remote party comprising:
determining, automatically by the method, a first location in a first stored received audio information stream of the remote party in a plurality of stored received audio information streams,
wherein a pointer points to the first location, and
wherein the first location represents a point in time when a sound detection flag became active during rendering of the audio information stream of the remote party, wherein the sound detection flag is activated when an indication is received of at least one of (i) a local user wants to talk and (ii) locally generated sound is detected;
selecting, automatically by the method following the determining and following the sound detection flag going active that indicates an interruption of the remote party, a second location in the stored audio information stream based on characteristics of the stored audio information stream;
moving, automatically by the method following the selecting, the pointer from the first location to the second location in the first stored received audio information stream;
mixing the streams in the plurality of stored received audio information streams starting with audio information stored at the second location in the first stored received audio information stream to form a stored audio information stream; and
rendering the stored audio information stream, wherein during the rendering of the stored audio information stream, echo is reduced by attenuating an audio output signal of the audio information stream from a device of said local user.

13. A system comprising:
a device couplable to a communication network, the device comprising:
a local sound detector, wherein the local sound detector activates a sound detection flag when an indication is received by the local sound detector of at least one of (i) a local user wants to talk and (ii) detection of locally generated sound;
a controlled memory coupled to receive, from at least one remote facility, an audio information stream of a remote party speaking, and configured to store therein the audio information stream;
a memory having stored therein instructions for conversational rendering with echo reduction; and
a sound processor coupled to the controlled memory, coupled to the memory, and coupled to receive the sound detection flag from the local sound detector, wherein the sound processor causes the controlled memory to store the audio information stream when the sound detection flag is active; and upon execution of the instructions for conversational rendering with echo reduction by the sound processor, the sound processor is configured to:
determine automatically a first location in the stored audio information stream in the controlled memory, wherein a pointer points to the first location, and the first location represents a point in time when the sound detection flag became active during rendering of the audio information stream of the remote party;
select, automatically following the determination of the first location and following the sound detection flag going active that indicates an interruption of the remote party, a second location in the stored audio information stream based on characteristics of the stored audio information stream;
move, automatically following the selection, the pointer from the first location to the second location in the stored audio information stream in the controlled memory; and
retrieve, from the controlled memory, the stored audio information stream starting with audio information stored at the second location and pointed to by the pointer; and
render the retrieved audio information, wherein during the rendering of the stored audio information stream, echo is reduced by attenuating an audio output signal of the audio information stream from the device.

14. The system of claim 13, the sound processor further configured to accelerate the stored audio information stream.

15. The system of claim 13, the sound processor further configured to accelerate the stored audio information stream prior to the rendering.

* * * * *